United States Patent [19]

Uhlig

[11] 4,362,496
[45] Dec. 7, 1982

[54] APPARATUS FOR MAKING PLASTIC ARTICLES

[75] Inventor: Albert R. Uhlig, Toledo, Ohio

[73] Assignee: Owens-Illinois, Inc., Toledo, Ohio

[21] Appl. No.: 291,714

[22] Filed: Aug. 11, 1981

Related U.S. Application Data

[60] Division of Ser. No. 164,664, Jun. 30, 1980, Pat. No. 4,323,340, which is a division of Ser. No. 854,555, Nov. 25, 1977, Pat. No. 4,305,902, which is a continuation of Ser. No. 670,936, Mar. 26, 1976, abandoned, which is a continuation of Ser. No. 461,361, Apr. 16, 1974, abandoned.

[51] Int. Cl.³ .............................. B29F 3/08; B29F 1/08
[52] U.S. Cl. .............................. 425/379 R; 425/548; 425/550; 425/558; 425/381
[58] Field of Search ............... 425/526, 532, 547, 548, 425/550, 558, 325, 326.1, 327, 378 R, 379 R, 380, 381; 264/540–543, 209.2, 209.8, 209.7, 210.2, 210.6, 176 R, 310, 312

[56] References Cited

U.S. PATENT DOCUMENTS

| | | | |
|---|---|---|---|
| 3,256,560 | 6/1966 | Adomaitis | 264/108 X |
| 3,288,898 | 11/1966 | West | 264/503 |
| 3,433,862 | 3/1969 | Weber | 264/540 |
| 3,733,309 | 5/1973 | Wyeth et al. | 264/540 X |

FOREIGN PATENT DOCUMENTS

338299  6/1959  Switzerland .

Primary Examiner—Jan H. Silbaugh
Attorney, Agent, or Firm—Charles S. Lynch; Myron E. Click; David H. Wilson

[57] ABSTRACT

Disclosed is a method and apparatus for forming multi-directionally oriented plastic articles by accumulating a body of plasticized thermoplastic material in an amount at least sufficient to form the desired article, and advancing the material under pressure from said body forward and through an orifice. The material is non-linearly sheared while being advanced from the body toward the orifice and prior to its issuance from the orifice to induce orientation stresses into the material, and during shearing the material is at a temperature which is conducive to orientation. The orientation stresses are frozen into the material when the material is formed to a desired configuration exteriorly of the orifice by known plastic forming techniques, such as extrusion, blow molding, injection molding, compression molding, thermoforming and the like. During such forming, additional orientation stresses may be induced in the material and superimposed upon those stresses previously introduced thereinto.

1 Claim, 16 Drawing Figures

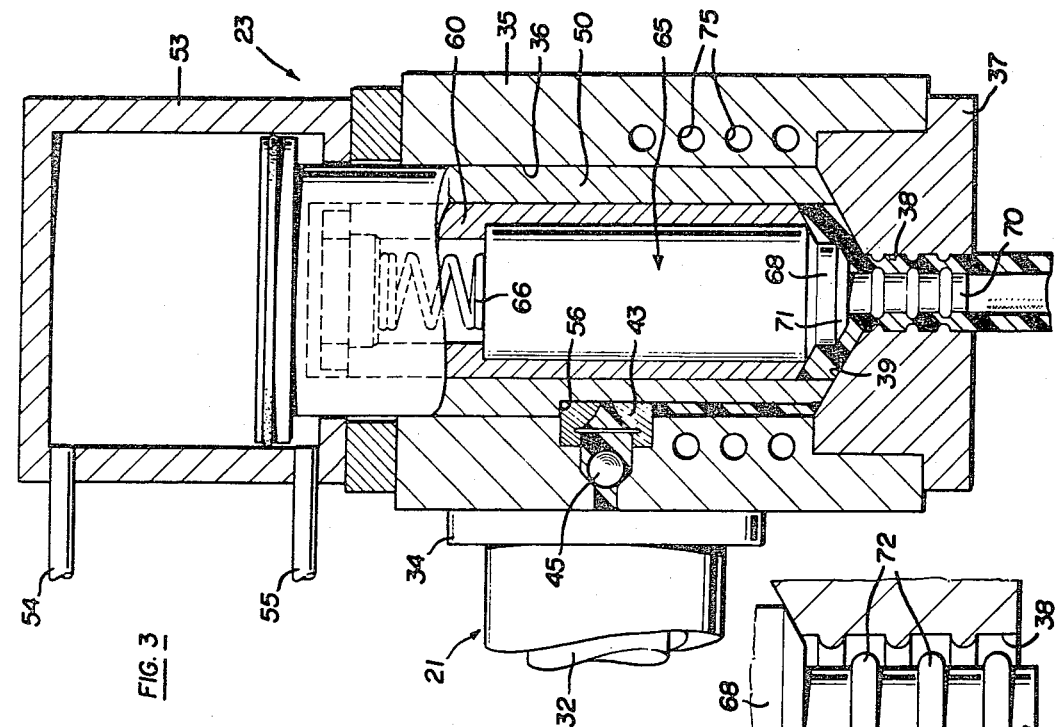
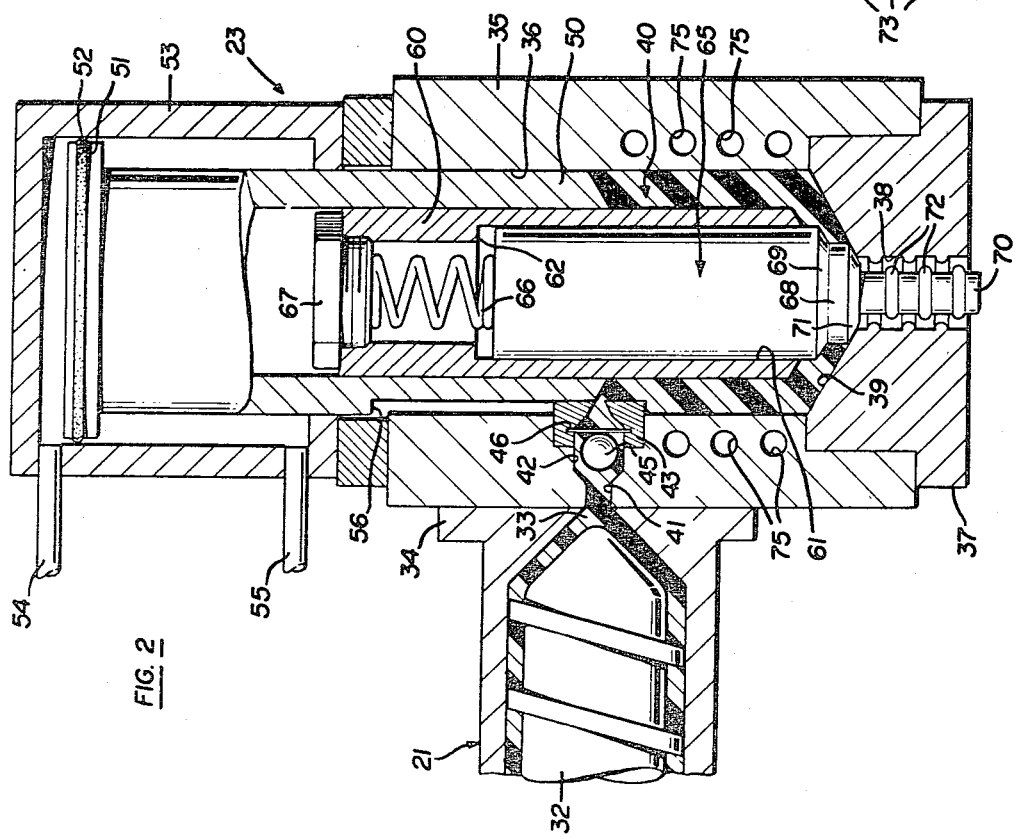

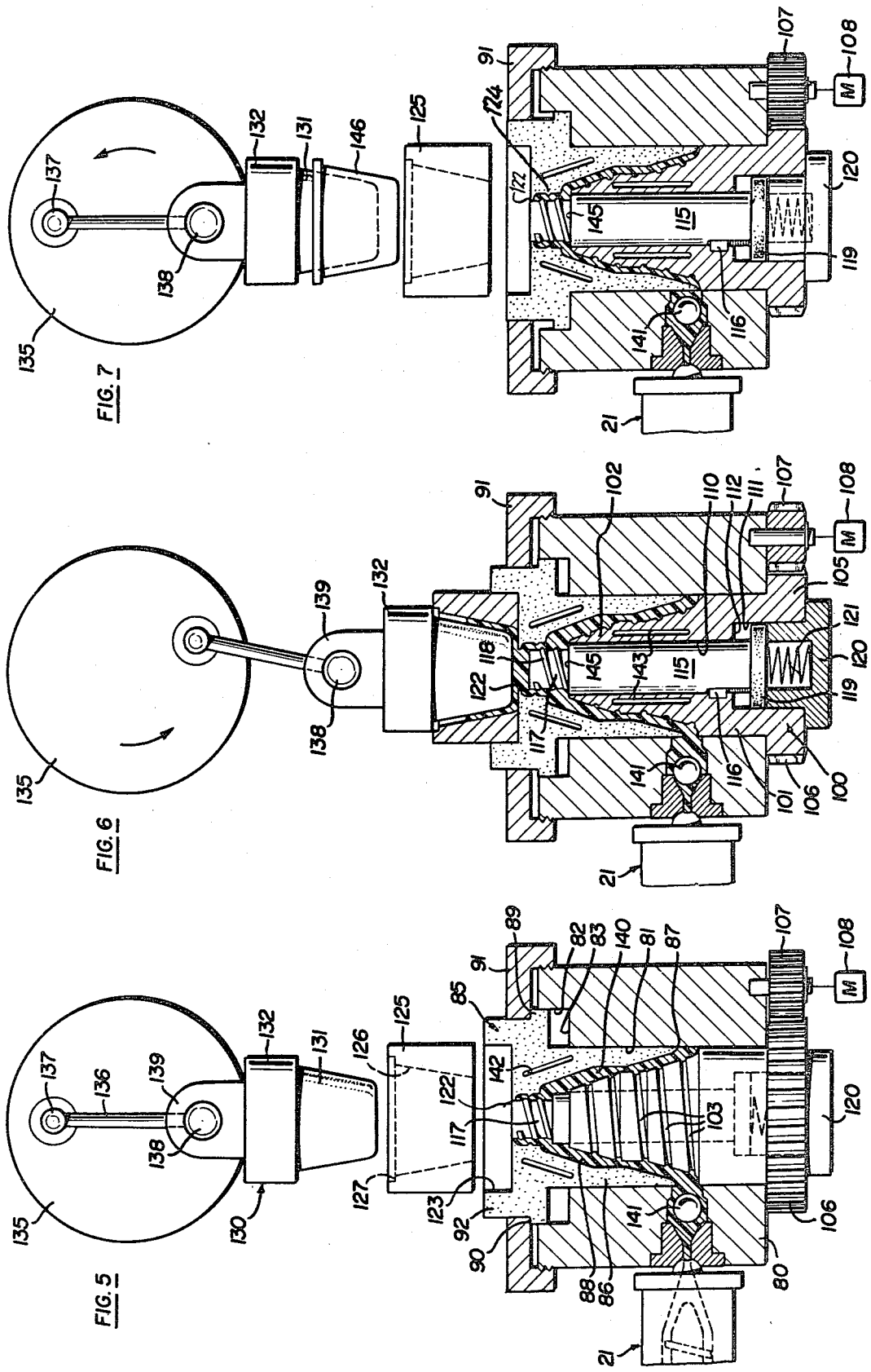

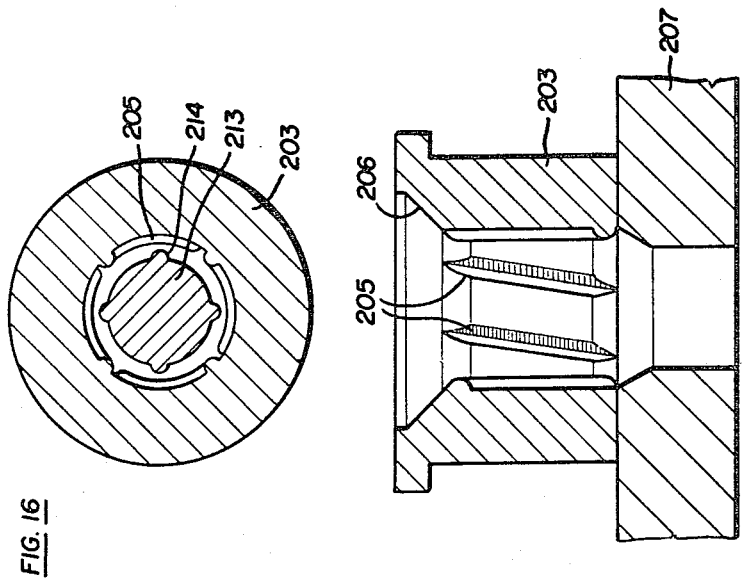
FIG. 16
FIG. 15
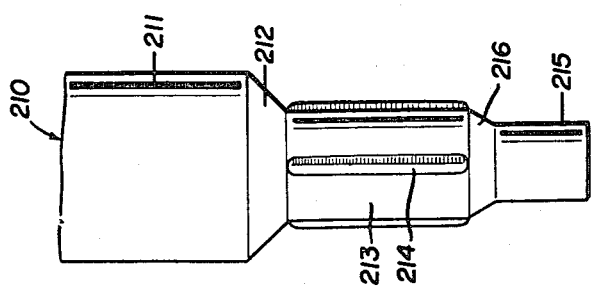
FIG. 14
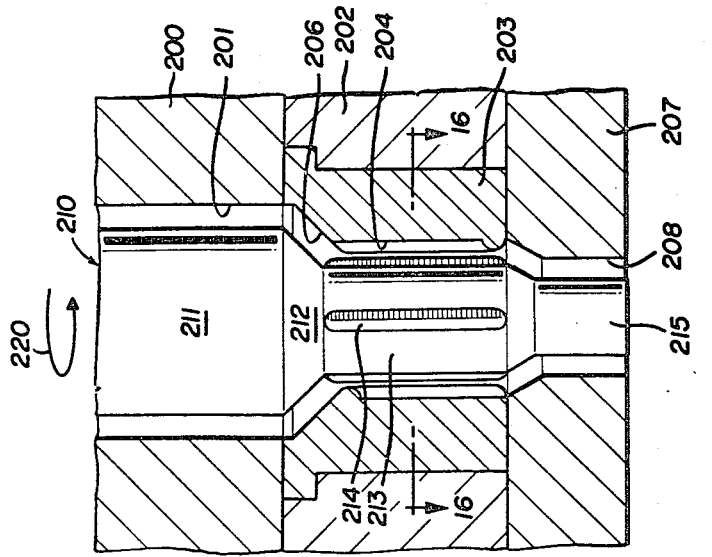
FIG. 13

APPARATUS FOR MAKING PLASTIC ARTICLES

This is a division of application Ser. No. 164,664, filed June 30, 1980, now U.S. Pat. No. 4,323,340, which is a division of Ser. No. 854,555, filed Nov. 25, 1977, now U.S. Pat. No. 4,305,902, which is a continuation of Ser. No. 670,936, filed Mar. 26, 1976, now abandoned, which is a continuation of Ser. No. 461,361, filed Apr. 16, 1974, now abandoned.

BACKGROUND OF INVENTION

It has long been known that thermoplastic materials may be "oriented", i.e., the molecules of the material are oriented or aligned and then frozen into their aligned relationship. Such orientation increases the physical properties of the material in the direction of orientation.

For example, in "stretch oriented" filaments, an extruded strand is stretched axially, and the tensile strength of the strand is increased by several orders of magnitude related to the amount of stretching. Similarly, sheet material can be "bi-axially oriented" by stretching the sheet longitudinally and transversely. The physical strength of such a bi-axially oriented sheet is again increased by several orders of magnitude. In a similar manner, blow molded articles can be "multi-directionally oriented" by simply blowing the material into a final article, the stretching of the parison or preform upon blowing to the final shape accomplishing the orientation. In a blown article, the physical properties are increased upon orientation, and the greater resistance of the wall to the transmission of vapor there through is also known to be a consequence of multi-directional orientation.

In order to accomplish orientation in thermoplastic articles by presently known techniques, the material must be stretched while it is at a temperature conducive to orientation, i.e., a temperature at which the molecules are sufficiently mobile to be oriented and yet are not so mobile as to immediately lose the orientation which has been induced therein. Some orientation is necessarily included into any thermoplastic material as it is issued from an orifice, as in normal extrusion or injection molding operations, but the material is linearly oriented in the direction of flow only, and the material is at such an elevated temperature that the orientation is dissipated by random rearrangements of the thermally active molecules. It has been determined that the thermal decay of orientation is inversely proportional to the temperature of the materials at the time the orientation stress is induced. In other words, at normal extrusion temperatures, on the order of 400° F., the orientation induced during flow through the orifice is dissipated by molecular rearrangement in an extremely short period of time, usually on the order of 0.1 seconds.

As a result, present orientation procedures are carried out after the thermoplastic material has issued from the orifice and has been cooled exteriorly of the orifice to a temperature at which the molecules are less mobile and the orientation dissipation times are greatly increased. For example, in stretch orientation, the extruded material is cooled in a water bath and then reheated in a "orienting oven" to a temperature substantially less than extrusion temperature, and the extruded, chilled and reheated strand is then stretched. In blow molding, an injection molded parison is chilled in the open air after injection and is then blown. Alternatively, an extruded parison is chilled to a rigid state and then reheated to a temperature substantially less than extrusion temperature, so that orientation can be obtained during blowing at the lower temperature. Orientation is normally not accomplished in injection molding, since the material is injected into he mold at or near its melt temperature, at which temperature any orientation obtained at the orifice is dissipated before the mold filling and chilling operation is complete.

BRIEF DESCRIPTION OF THE INVENTION

The present invention now proposes a method of and apparatus for forming multi-directionally oriented plastic articles in a more effective and more efficient manner by inducing orientation in a thermoplastic material as it issues from an initial forming orifice and without any of the additional, repetitive, post-orifice operations required by the prior art.

Generally, the present invention contemplates the issuing of thermoplastic material in a plasticized state from an initial orifice with orientation strains induced into the material and with the material at a temperature conducive to orientation, so that further processing of the material immediately exterior to the orifice will produce a multi-directionally oriented article. The elimination of post-orifice cooling or chilling and reheating steps substantially speeds up the forming cycle for such oriented articles, and it is simply necessary to carry out the normal plastic forming techniques, such as extrusion chilling, blow molding, injection molding, compression molding, thermoforming, or the like upon the already-oriented material issuing from the orifice. The economy due to faster cycle times, the elimination of cooling or reheating operations, and the simplification of the forming apparatus will be readily appreciated. Further, it is possible to superimpose additional orientation stresses on those already present in the material issuing from the orifice, thereby obtaining articles of enhanced physical properties over those previously known.

Generally, the thermoplastic material is plasticized and accumulated in a body adjacent an orifice, the body being cooled or tested to a temperature such that it is a temperature conducive to orientation as the material issues from the orifice. The material is expressed under pressure from the accumulated body to and through an orifice. As the material travels to the orifice, it is non-linearly sheared, preferably repeatedly, to induce orientation stresses into the material. As the material is sheared, its temperature may rise to a greater or lesser extent. The temperature at which the body of material is accumulated prior to shearing is adjusted to that, during shearing, the material is at a temperature most conducive to orientation.

The forces necessary to shear the material may be generated by the pressure at which the accumulated material is expressed from the accumulated body, i.e., the material may simply flow through a labyrinthian passage defined by alternate restrictive and relatively open areas, or the shear forces may be generated externally, as by rotation of one of the orifice-defining elements. In either event, the shearing is "non-linear", i.e., not simply axial to the direction of flow through the orifice.

As the sheared, highly stressed material issues from the orifice, it is immediately further processed by known plastic forming techniques to a finished, multi-directionally oriented article.

The apparatus of this invention includes an accumulator for receiving plasticized material from a conventional plasticizer of any desired type, means for controlling the temperature of material stored in the accumulator, and means for expressing material from the accumulator under pressure. Since the flow viscosity of plasticized material at orientation temperature is much greater than at normal plasticizing temperatures, the power discharge of the accumulator is necessary.

The orifice through which accumulator discharge occurs is the orientation orifice. This orientation orifice can take several forms, but in essence, the orifice configuration is calculated and designed to generate repeated, non-linear shearing forces in the material flowing through the orifice. Several different orifice configurations are disclosed herein.

The specific post-orifice processing apparatus forms no part of this invention, so long as the processing is carried out promptly and effectively before the orifice-induced orientation decays. Several different types of such processing apparatus are proposed, ranging from a simple chilling of an extrusion, to blow molding, to injection molding. Any other desired type of processing apparatus may be used as desired.

OBJECTS

It is, therefore, an important object of the present invention to provide a method of an apparatus for forming oriented plastic articles by expressing plasticized thermo-plastic material through an orifice and shearing the material in a non-linear shear pattern while the material is at a temperature conducive to orientation, the material being chilled and set by conventional plastic forming operations performed exterior to the orifice and performed prior to thermal decay of the multi-directional orientation induced in the material during the shearing step.

Another important object of this invention is the provision of a method of and apparatus for forming oriented plastic articles by accumulating a body of plasticized thermo-plastic material adjacent an orifice and at a temperature not greater than that temperature which is conducive to orientation, and expressing the material from the body through an orifice while shearing the material in a non-linear shear pattern to effect multi-directional orientation in the material issuing from the orifice.

It is a further important object of this invention to provide a method of and apparatus for making a plastic article by providing plasticized thermo-plastic material at a temperature conducive to orientation of the material and displacing the material through an orifice while repeatedly and progressively non-linearly shearing the material to multi-directionally orient the material, and then further processing the material exteriorally of the orifice while the material is still oriented as the result of the shearing operation.

It is yet another, and no less important, object of this invention to provide a method and apparatus for the formation of oriented plastic articles by plasticizing thermo-plastic material at a normal plasticizing temperature, segregating a body of the plasticized material, chilling the accumulated body of material to a temperature no greater than a temperature conducive to orientation of material, issuing material from the body while shearing the material in a non-linear shear pattern to multi-directionally orient the material, and chilling the oriented material immediately after the shearing operation and prior to appreciable thermal decay of the orientation thereof.

Other and further objects of the present invention will become readily apparent from the appended disclosure and claims.

ON THE DRAWINGS

FIG. 2 is an enlarged, fragmentary, sectional view of a portion of the apparatus of FIG. 1 in an initial or starting operation of a blow molding cycle;

FIG. 3 is a view similar to FIG. 2 illustrating the apparatus of FIG. 1 during the performance of a blow molding cycle;

FIG. 4 is an enlarged view of the orifice design of the blow mold machine of FIGS. 1 through 3;

FIG. 5 is a fragmentary, elevational, somewhat schematic view of an injection molding apparatus of the present invention capable of carrying out the present invention, the apparatus being shown prior to the initiation of an injection molding cycle;

FIG. 6 is a view similar to FIG. 5 showing the apparatus carrying out an injection molding cycle;

FIG. 7 is a view similar to FIG. 5 but illustrating the apparatus at the completion of an injection molding cycle;

FIG. 13 is a fragmentary, sectional view of an orifice design similar to that of FIGS. 8 and 9;

FIG. 14 is a view of the mandrel tip alone of the design of FIG. 14;

FIG. 15 is a view of the orifice arrangement alone of FIG. 13; and

FIG. 16 is a sectional view taken along the plane 16—16 of FIG. 13.

AS SHOWN ON THE DRAWINGS

Figure 1:
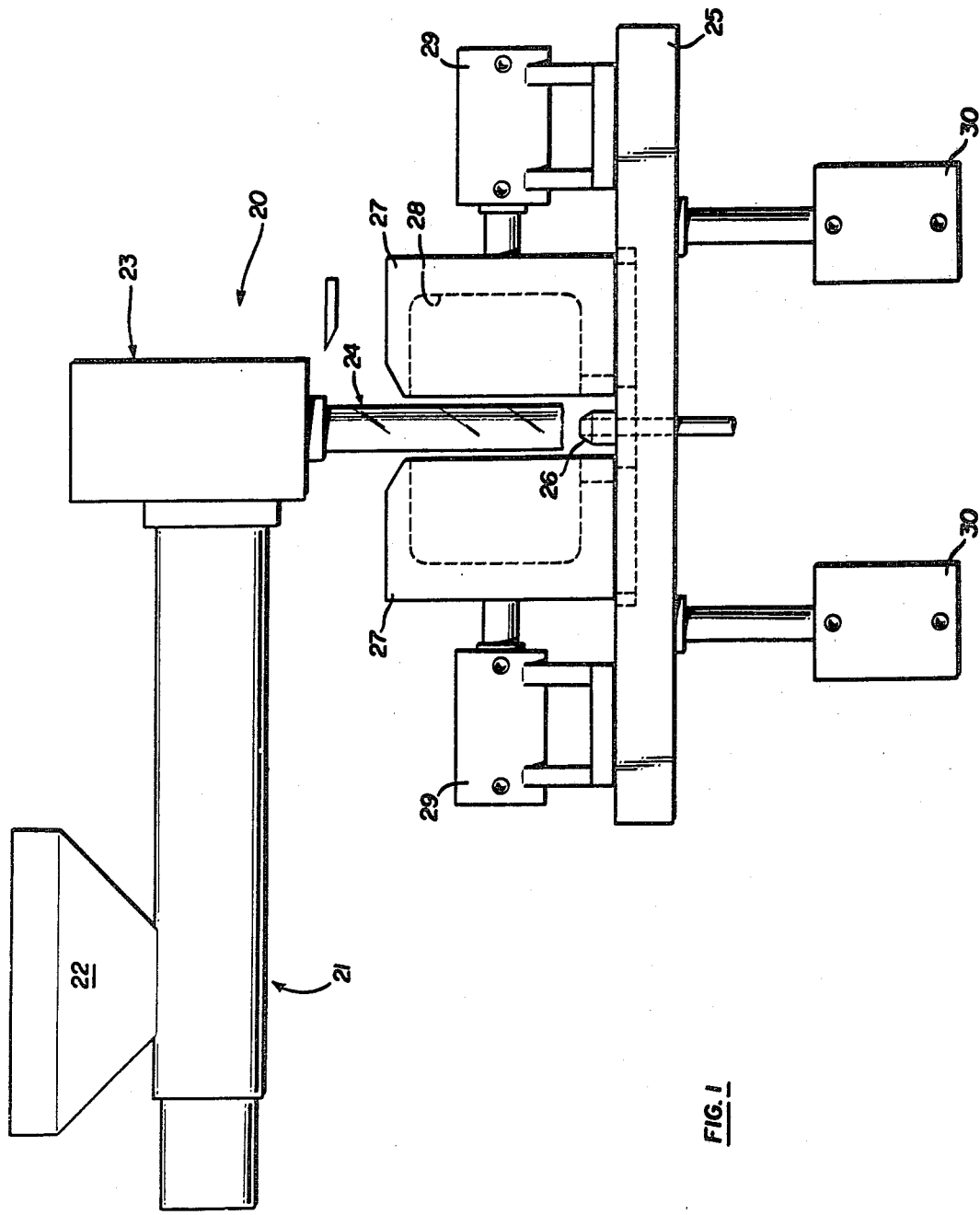
FIG. 1 is a schematic representation of a blow molding machine incorporating the method and apparatus of the present invention.

In FIGS. 1-4, reference numeral 20 refers generally to an article forming apparatus of the present invention, in this particular instance a blow molding machine. This blow molding machine comprises a reciprocating screw extruder 21 of conventional type and receiving pelletized thermoplastic material, such as PVC, polyethylene, polypropylene or the like, from an overhead supply hopper 22.

The machine includes a vertically extending accumulator 23, hereinafter described in greater detail, from which a freely pendant tubular parison 24 issues downwardly. A support table 25 underlying the parison 24 carries an upstanding blow pipe 26 fixed to the table and connected to a source of air or other blowing medium under pressure. A pair of blow mold sections 27 cooperatively define an interior mold cavity 28 conforming to the shape to be formed. These blow mold sections 27 are opened and closed by actuating cylinders 29 movable with the table 25 and supported therefrom. The table itself, together with the blow mold sections 27 and the blow pipe 26 is elevated and lowered by vertically disposed actuating cylinders 30.

This type of blow molding machine is quite well known in the art. The details of the blow molding machine per se form no part of the present invention.

As best shown in FIG. 2, the extruder 21 includes a reciprocating screw 32 which advances plasticized material toward an extruder outlet opening 33. Secured to the mounting flange 34 is the accumulator indicated generally at 23. An accumulator block 35 has a vertically disposed, cylindrical bore 36 closed at its lower end by an orifice block 37 having a vertical orifice bore 38 opening onto the accumulator chamber defined by the vertical bore 36. The upper surface of the orifice block 37 is chamfered, as at 39, to define an upper valve seat surrounding the orifice opening 38 at its accumulation chamber end, as will be hereinafter more fully described.

The accumulator chamber 40 defined by the opening 36 communicates with the outlet opening 33 of the extruder through a reduced bore 41, an enlarged check valve bore 42 and a check valve body 43. A spherical ball check 45 is confined in the chamber 42 between the reduced opening 41 and the limit pin 46 carried by the check valve body 43. The function of the check valve ball 45 is quite simple. When the pressure in the extruder 32 exceeds that in the chamber 40, the check valve rests against the pin 46, accommodating the flow of plasticized material from the extruder into the accumulator chamber 40. When the pressure in the accumulator chamber exceeds that of the extruder 32, the ball check 45 closes the opening 41 preventing communication, as best shown in FIG. 3.

Disposed within the accumulator chamber 40 is an accumulator piston 50. This accumulator piston 50 is tubular and projects upwardly beyond the confines of the accumulator chamber 50 to bear at its upper end an enlarged piston head 51 having a peripheral seal 52 confined in an actuating cylinder 53, this cylinder 53 surmounting the accumulator body 35. The cylinder 53 receives hydraulic equipment from a source of such liquid under pressure (not shown) through upper supply line 54 and the lower supply line 55. The accumulator piston 50 has an axially extending slot 56 in its outer periphery to accommodate the check valve body 43 which projects slightly radially into the chamber 40.

Telescopically received within the bore of the tubular accumulator piston 50 is a tubular valve guide 60 which is secured against axial displacement by a spider (not shown) carried by the accumulator body 35. This valve guide 60 is provided with a downwardly opening cylindrical recess 61 forming a stop shoulder 62 where the recess intersects the bore of the tubular valve guide 60. Positioned in the recess for axial sliding motion therein is a cylindrical valve body 65 which is constantly urged downwardly in the recess 61 by a compression spring 66 confined between the upper surface of the valve body 65 and a threaded cap 67 secured to the upper end of the valve body 60.

The lower end of the valve body 65 is provided with reduced cylindrical extension 68 joined to the remainder of the valve body 65 by a chamfered actuating face 69 projecting axially from the extension 68. Extending into the lower orifice opening 38 is an orifice mandrel 70 joined to or integrally formed with the valve body extension 68 through a chamfered valving face 71 which sealingly engages the chamfered upper face 39 of the orifice plate 37 when the valve body 65 is normally urged downwardly to its lowermost position by the compression spring 66.

As best shown in FIG. 4 of the drawings, the orifice mandrel 70 is provided with a series of axially spaced, separate, annular, peripheral rib 72 which project radially from the orifice mandrel 70 toward the orifice bore 38. Similarly, the orifice bore 38 is provided with a plurality of radially inwardly projecting, annular peripheral protuberances 73 which project inwardly toward the mandrel extension 70.

The operation of the device of FIGS. 1 through 4 will be apparent from a comparison of FIGS. 2 and 3. In FIG. 2, plasticized material from the extruder screw 32 passes through the extruder opening 33 and the passage 41 past the ball check valve 45 into the annular accumulator chamber 40 defined between the accumulator block bore 36 and the exterior surface of the valve guide 60. Fluid under pressure through the hydraulic cylinder line 55 has previously raised the piston 51. The force of the spring 66 is great enough to retain valve body 65 seated, i.e., with the chamfered valve face 71 contacting the valving surface 39 of the orifice block 37, despite the fact that the actuating face 69 of the valve body 65 is exposed to the pressure of the plasticized material from the extruder.

Thus, when the accumulator is in its condition of FIG. 2, no plasticized material is being dispensed from the accumulator. Further, heat exchange fluid is circulated through the coolant passages 75. Generally, this coolant will be a chilling medium to reduce the temperature of the plasticized material filling the accumulator chamber from the melt temperature of the plasticized material to a temperature which is conducive to orientation of the plasticized material.

Those temperatures which are conducive to orientation in thermoplastic materials vary with the specific material. The average temperature for each essentially crystalline polymer lies intermediate the crystalline melting point of the material plus 20° F. and the crystalline freezing point of the material less 20° F. With respect to essentially amorphous polymer, such as polyvinyl chloride and polystyrene, the glass transition temperature is utilized, rather than crystalline melting and freezing temperatures. For high density polyethylene (having a density lying between 0.954 and 0.970) it is preferable to operate at a temperature of 250° F. plus or minus 20° F. For polyvinyl chloride the ideal orienting temperature is 205° F. plus or minus 25° F., and for polystyrene 266° F. plus or minus 10° F., for polypropylene, the ideal temperature is 275° F. plus or minus 10° F.

When it is desired to express material from the accumulator and with the accumulator in its condition of FIG. 2, fluid is introduced thru hydraulic line 54 into the cylinder 53 to displace the piston 52 downwardly, toward its FIG. 3 position. The first displacement of piston 51 will, of course, increase the pressure in the accumulator space 40. This increase in pressure will (1) displace the ball check valve 45 to the left to prevent the flow of material from the chamber 40 into the extruder 32, and at the same time (2) react against the actuating surface 69 of the valve body 65 to displace the valve body 65 upwardly against the compression spring 66. This action opens the orifice to the accumulation chamber 40.

Further downward movement of the piston 50 will force material from the accumulator chamber 40 through the orifice. The expression of material through the orifice will subject the material to non-linear shearing forces, because the material must flow between the alternature, spaced protuberances formed on the mandrel 70 and on the orifice bore surface 38. As a result, the material flows through a tortuous flow path of alternately restricted and enlarged size, so that the material is repeatedly and progressively non-linearly sheared. The material is expressed thru the orifice under substantial pressure, preferably in excess of 20,000 psi.

Since the material is at a temperature conducive to orientation, this shearing will cause the material to orient as it is expressed from the accumulator space 40 through the orifice under the force of the rapidly moving piston. The tubular parison 24 is thus rapidly issued from the orifice and between the open blow mold section 27 onto the blow pipe 26. Cylinders 29 are immediately actuated to enclose the parison, and the parison is immediately blown to its final configuration. The blowing operation is carried out in a conventional manner well-known in the prior art. It appears unnecessary to describe the blowing operation in detail.

As above explained, time is of the essence, so that the orientation induced in the parison during the repeated shearing at the orifice is not thermally dissipated or degraded by the passage of time before the article is blown to its final configuration and the orientation is frozen in. Of course, additional orientation will be obtained because of the inflation of the parison to the larger final article interiorly of the blow mold sections 27.

THE EMBODIMENT OF FIGS. 5-7

In that embodiment of the invention as illustrated in FIGS. 5-7, a different form of accumulator and orifice arrangement is utilized for injection molding.

More specifically, the extruder 21 communicates with a support block 80 having a vertical bore 81 therein and an enlarged counterbore 82 defining a horizontal stop surface 83. Positioned in the bore 81 is a displacement bushing, indicated generally at 85. This displacement bushing has a lower cylindrical portion 86 sealingly received in the bore 81 and terminating at a lower open end 87. The bushing 85 has an axial bore 88 of stepped configuration diminishing generally upward for a purpose to be hereafter more fully explained.

The bushing carries a radially enlarged shoulder 89, the lower surface of which abuts the stop shoulder 83 of the block 80 when the bushing is fully displaced downwardly, as illustrated in FIG. 7. The upper surface 90 of the shoulder 89 contacts the under surface of a threaded adjustment cap 91 when the bushing 85 is in its full upward position, as shown in FIG. 5. This adjustment cap 91 is annuler to receive the upper cylindrical end 92 of the bushing therethrough, and the cap 91 is threaded to adjustable engage the threaded exterior upper surface of the block 80.

Extending axially through the bore of the bushing 85 is a rotatable core 100. This core 100 has a lower cylindrical portion 101 snugly received within the bore 81 of the block 80 and an upper, generally conical, stepped extension 102 projecting into the bore 88 of the bushing 85. The exterior surface of the extension 102 is provided with a peripheral, spiral thread 103. The lower cylindrical portion of the core 100 projects downwardly beyond the bore 81 of the block 80, as at 105, and the exterior of this projection is provided with gear teeth 106 which mesh with a spur gear 107 driven by a motor 108.

The core 100 is provided with an axial bore 110 projecting completely therethrough and countersunk as at 111 to provide a horizontal stop shoulder 112 adjacent the lower extremity of the bore. Positioned within the bore 110 of the core 100 is a cylindrical mandrel 115, this mandrel being keyed to the core, as at 116, to be corotatable with the core 100 and yet to be axially slidably displaceable with respect to the core 100. The upper, cantilevered free end 117 of the mandrel 115 projects beyond the core 100 and is provided with a helical peripheral thread 118.

The lower extremity of the mandrel 115 is provided with an enlarged head 119 snugly guided within the counterbore 111 of the core 100. An end cap 120 is seated in the counterbore 111 and provides a lower stop for the head 119, and a compression spring 121 is confined within the cap 120 to bear against the undersurface of the head 119. The spring 121 normally urges the mandrel upwardly to its position of FIG. 5, but accommodates movement of the mandrel downwardly to its position of FIG. 6 against the end cap 120.

The free upper end of the mandrel 115 sealingly fits into an orifice 122 the bore 88 is cylindrical and threaded, as at 124. When the mandrel 115 moves downwardly against the compression spring 121, the orifice 122 is open, as illustrated in FIG. 6, and the orifice is in communication with an accumulation space between the displacement bushing bore 88 and the exterior surfaces of the core 100 and the mandrel 115.

The free upper extremity of the displacement bushing 85 is recessed, as at 123, to receive the lower end of a cylindrical mold 125 having therein an interior frusto conical recess 126 open at its lower end and counterbored at its upper end to provide an enlagged lip recess 127. An overhead mold core 130 cooperates with the one-piece mold 125, this mold core having a lower frusto conical plug portion 131 insertable into the mold cavity 126 and an enlarged upper stop shoulder 132 abutable with the upper surface of the mold 125 when the mold 125 and the mold core 130 are assembled as illustrated in FIG. 6.

The mold core is actuated by a fly wheel 135 having a crank arm 136 attached adjacent the periphery thereof, as at 137, and also attached as at 138, to an actuating ear 139 carried by the mold core and projecting above the shoulder 132. Of course, both the mold 125 and the mold core 130 are guided for vertical movement only by suitable guide means (not shown).

The operation of the device of FIGS. 5, 6 and 7, will be readily apparent from a comparison of these Figures. The operation of the extruder has filled the accumulator space 140 between the bushing bore 88 and the combined exterior surfaces of the displacement core 100 and the mandrel 115 with plasticized material. A check valve 141 interposed between the extruder and the space 140 accommodates flow of the plastic from the extruder to the space, but not the reverse flow, in the manner hereinbefore described in connection with the embodiments of FIGS. 1 through 4.

The plastic material in the space 140 is appropriately cooled to a temperature which does not exceed that temperature at which the plasticized material is conducive to orientation, as above explained in detail. This cooling is accomplished by coolant passages 142 in the bushing 85 and coolant passages 143 in the displacement core 100.

Initially, the fly wheel 135 is actuated to lower the mold core 130 until the shoulder 132 thereof abuts the upper surface of the mold 125. Then the mold core and the mold are jointly lowered into the recess 123 in the bushing 85. The fly wheel is further actuated to displace the mold 125 and the core 130 downwardly, jointly with the bushing 100. This movement of the bushing is accommodated by the space between the stop surfaces 83 and 90, and the extent of this displacement can be varied by threadedly adjusting the cap 91 on the peripheral threads on the block 80.

The displacement of the bushing 85 downwardly reduces the volume of the accumulator space 140, thereby increasing the pressure of the plasticized material in the space 140. This increase in pressure seats the ball check valve 141 as illustrated in FIG. 6, and this increase in pressure also displaces the mandrel 115 downwardly within the displacement core 100. For this purpose, the mandrel 115 is provided with an upwardly facing, radial shoulder 145 defined at the intersection of the body of the mandrel 115 and the reduced upper threaded extremity 117 thereof. The area of the shoulder 145 is balanced against the compressive force of the spring 121, so that the mandrel normally occupies its position of FIG. 5 when the accumulator space 140 is filled under the pressure of the extruder 21. However, upon an increase in pressure, the biasing force of the pressure exerted on the shoulder 145 will exceed the compression force of the spring 121, and the mandrel will move downwardly from its position of FIG. 5 to its position of FIG. 6.

The downward mandrel movement first opens the orifice 122. Continued downward movement of the core 130, the mold 125 and the bushing 85 will further reduce the size of the accumulator space 140, and plastic material will be displaced from the space 140 into the mold cavity cooperatively defined by the mold core 130 and the mold 125. The material in the space 140 must flow upwardly over the helical grooves 103 in the displacement core 100 and also over the helical thread 118 formed on the mandrel tip 117. Additionally, the upper portion of the bore 88 in the bushing 85 is contoured at 124 with a helical thread of opposite hand to that on the mandrel tip. The rotation of the core 100 and the mandrel 115 by the motor 108 and the gears 107, 106 together with the helical surfaces subjects material flowing between the surfaces to repeated and progressive non-linear shearing action. As a result, the material issuing from the orifice 122 and displaced into the mold cavity will be multi-directionally oriented.

When the fly wheel 135 reaches its lowest point, the volume of the accumulator space 140 is at a minimum, and the pressure within the space 140 will be at its maximum. Further rotation of the fly wheel will raise the core 130 back toward its original position of FIG. 5 and will accommodate the return of the bushing to its original position of FIG. 5. In FIG. 7, the bushing 85 is illustrated at its lowest position, i.e., against the stop 83, and the volume of the space 140 is at a minimum. Since the fly wheel is no longer forcing the bushing 85 downwardly, there is no pressure in the space 140 except that pressure exerted by the extruder 21. The extruder pressure has unseated the ball check 141, and material is beginning to flow from the extruder into the space 140 to refill the accumulator. Under these circumstances, the mandrel 115 closes the orifice 122 under the pressure of the spring 121, and the continued flow of plasticized material from the extruder elevates the bushing 85 and the mandrel 115 upwardly to their original positions of FIG. 5.

The article 146 which is formed in the mold space provided between the core 130 and the mold 125 has been injection molded with oriented material while the material is at a temperature conducive to orientation obviously, the article 146 may be subsequently blow molded or otherwise further processed as desired.

Figure 9:
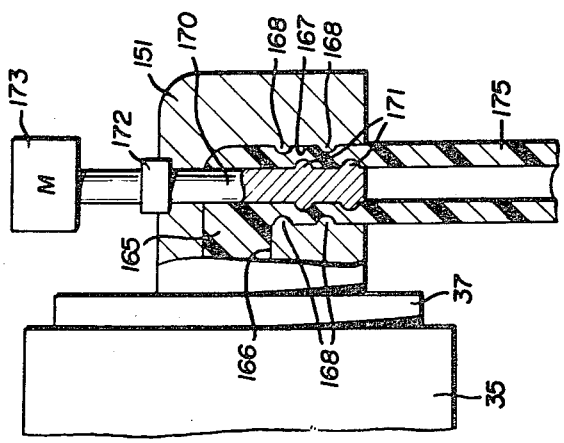
FIG. 9 is a fragmentary view, with parts broken away and in section, similar to FIG. 8, illustrating yet another orifice design of the present invention.
Figure 8:
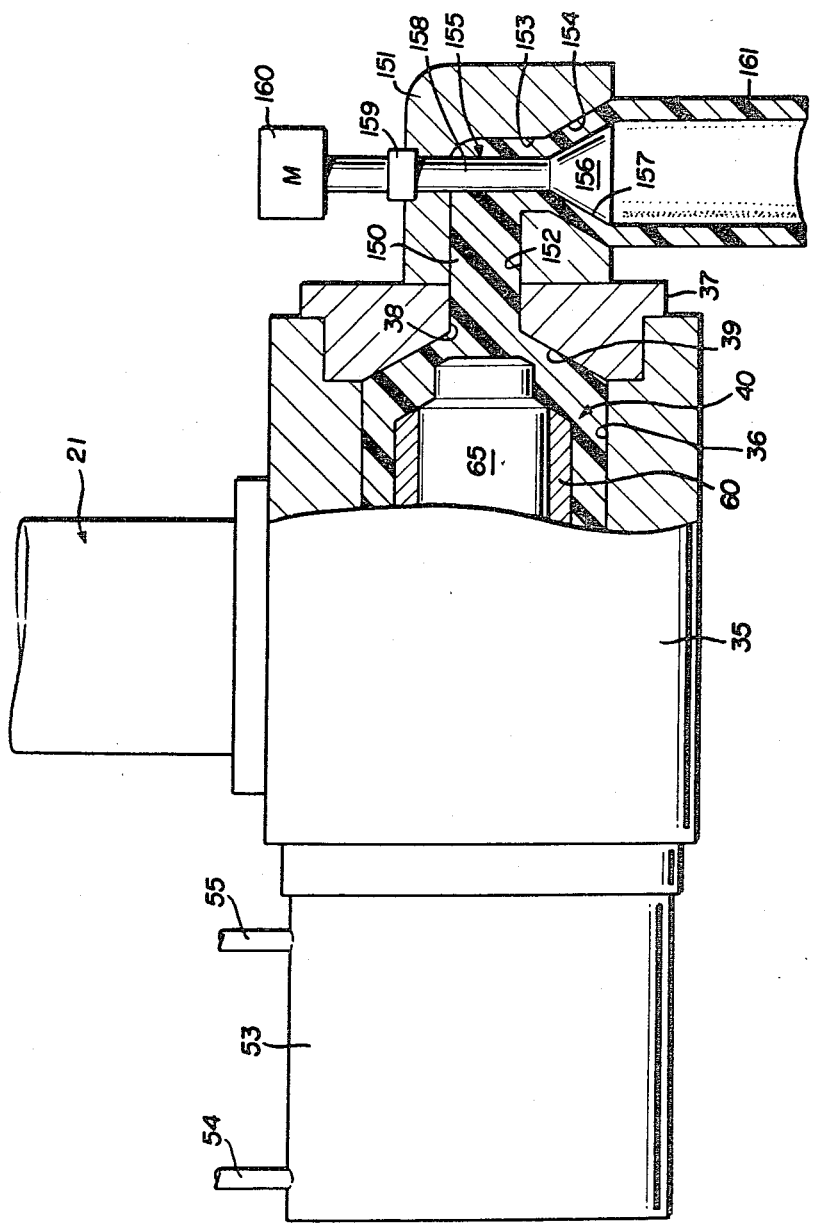
FIG. 8 is a fragmentary view, with parts broken away and in section, of an apparatus generally similar to that of FIGS. 1-4 but utilizing a different orifice design for the issuance of a tubular extrusion for use in blow molding or the like operations.

THE EMBODIMENT OF FIGS. 8 and 9

In FIG. 8, an accumulation system similar to that of the embodiments of 1-4 is utilized, and identical reference numerals refer to identical elements of this accumulator system.

In the embodiment of FIG. 8, plasticized material at a temperature conducive to orientation of the material is expressed through the accumulator discharge port 38 corresponding to the orifice 38 heretofore described, but of cylindrical form. The plasticized material 150 passes into an orifice block 151 having a horizontal inlet opening 152 aligned with the discharge orifice 38, and opening onto a vertical cylindrical passage 153 having a conical, downwardly opening orifice passage 154.

Positioned in this conical orifice opening 154 is a conical, rotatable mandrel indicated generally at 155 and comprising a conical head 156 somewhat smaller than the orifice 154 and defining therewith a conical discharge opening 157. The mandrel includes a stem portion 158 projecting vertically through the block 151 and journalled for rotation in the bearing 159. A drive motor 160 rotates the mandrel 155.

The plasticized material displaced by the accumulator through the opening 152 and flowing through the conical mandrel 157 is repeatedly sheared at its interior surface by the rotatable mandrel stem 158 and the rotatable conical mandrel tip 156, so that the tubular extrusion 161 is multi-axially oriented.

The tubular extrusion 161 can be utilized as a parison for a blow molding operation carried out as in FIGS. 1 through 4, or the tubular extrusion 161 can be simply chilled in its tubular shape, or tubular extrusion 161 as oriented can be utilized for any other purpose desired.

A different form of tubular extruder is illustrated in FIG. 9 of the drawings. Here, the orifice block 151 again receives plasticized material 165 from the accumulator 35, the material 165 flowing through a horizontal passage 166 communicating with a cylindrical vertical passage 167 provided with annular internally facing ribs 168. A vertical mandrel 170 of cylindrical form is provided with radially projecting annular protuberances 171, the mandrel 170 being journalled by a bearing 172 and driven by a motor 173.

The plastic material 165 expressed through the extrusion nozzle 151 of FIG. 9 is subjected to rotary shearing motion by virtue of the rotation of the mandrel 170, and at the same time the material is further sheared by being forced to flow over the successive annular protuberances 168, 171. This combination of shearing forces exerted on the material 165 forms a tubular extrusion 175 which again is multi-directionally oriented. Again, the tubing can be used for any desired purpose, as heretofore explained.

THE EMBODIMENTS OF FIGS. 10-12

Figure 12:
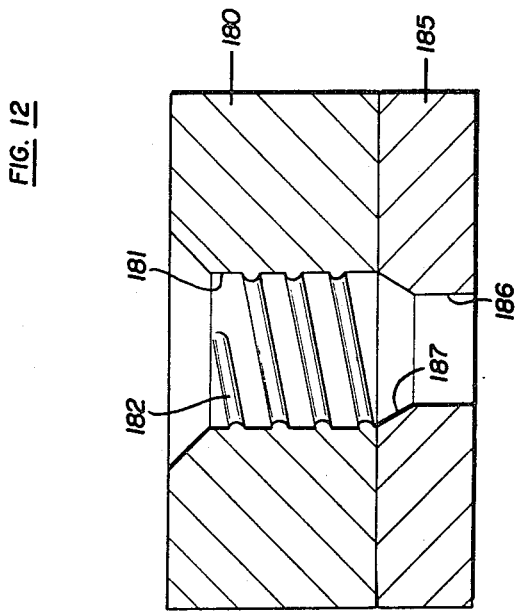
FIGS. 11 and 12 are fragmentary views of the mandrel tip and the orifice plate, respectfully, of the orifice design of FIG. 10.
Figure 11:
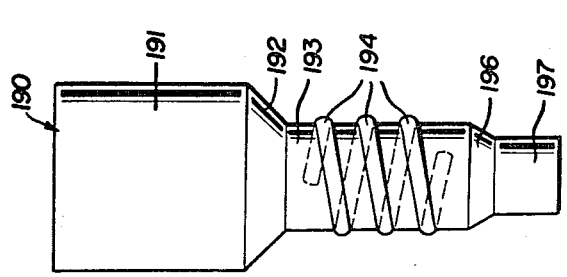
Figure 10:
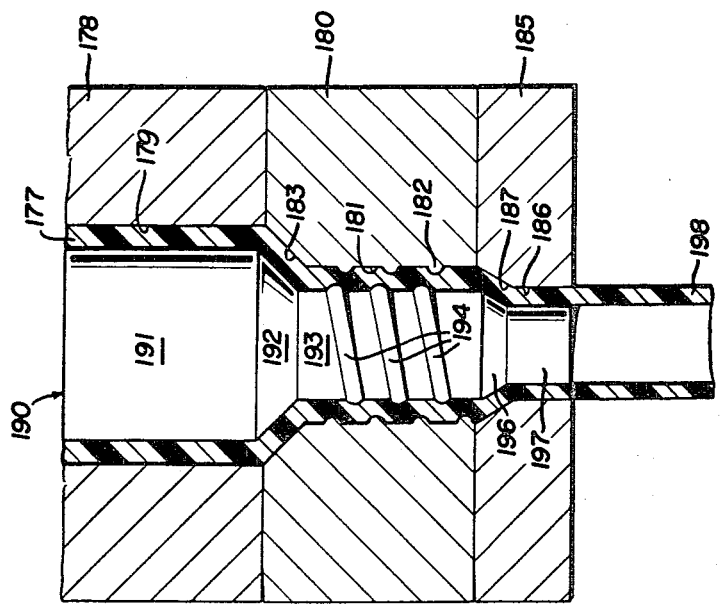
FIG. 10 is a fragmentary sectional view, of a different orifice design of the present invention.

In FIGS. 10-12, another shearing orifice arrangement is illustrated. It is understood that this shearing orifice arrangement receives plasticized material 177 at a temperature conducive to orientation from a source, for example, from the accumulator arrangement 35 already described in connection with previous embodiments of the invention.

The embodiment of FIG. 10 includes an upper structural element 178 having a cylindrical passage 179 therethrough, a second structural element 180 having a cylindrical opening 181 therein provided with a helical thread 182 best illustrated in FIG. 12, the opening 181 being joined to the passage 179 by conical joining portion 183. Th orifice block 185 underlies the element 180, this block having a cylindrical orifice passage 186 joined to the passage 181 by a conical joining portion 187. Projecting through the aligned openings 179, 181, 186, is a mandrel 190 comprising an upper cylindrical portion 191, a conical joining portion 192, a cylindrical extension 193 provided with threads 194, a lower conical joining portion 196 and a cylindrical mandrel tip 197 projecting axially through the passage 186. It will be noted that the threads 182 in the passage 181 and threads 194 of the mandrel portion 193 are of opposite hand.

The mandrel 190 may be utilized as the mandrel 65 of the accumulator system of the embodiment of FIGS. 1–4, or, alternatively, the mandrel 190 may be utilized as the mandrel of FIGS. 8 and 9. In either case, the mandrel 190 may be driven for rotation by suitable means, or the mandrel may be fixed against rotation.

In either event, plasticized material 177 displaced through the orifice block and mandrel configuration of FIGS. 9 through 12 issues as a tubular extrusion 198 which is oriented by the repeated shearing action caused by flow of the plasticized material through the tortuous, labrynthian passage defined between the threads 194, 182. In the event that the mandrel 190 is utilized as the equivalent of the valving member 65 of the embodiment of FIGS. 1–4, the conical portion 192 or the conical portion 196 may be utilized as a valving element in combination with the appropriate conical surface 183, 187, respectively.

THE EMBODIMENT OF FIGS. 13–16

FIGS. 13–16 illustrate another orifice configuration forming a part of the present invention and capable of carrying out the method of the present invention.

Once again, the orifice structure includes an upper block 200 having a cylindrical passage 201 therethrough, a mandrel block 202 having an insert 203 supported therein. This insert 203 comprises a cylindrical inner surface 204 provided with axially extending spiral ribs 205 of a configuration best illustrated in FIGS. 15 and 16.

The ribs 205 are generally axially extending, but are not parallel to the axis of the passage 204. The inclining of the ribs 205 with respective to the axis of the bore gives the ribs a partial spiral configuration. The bore 204 communicates with the upper bore 201 through an inclined conical joining portion 206. A lower outlet block 207 has a cylindrical bore 208 joined to the upper bore 204 through a conical joining portion 209.

Disposed within the successive elements 200, 202, 203 and 207 is a unitary rotatable mandrel indicated generally at 210 and specifically illustrated in FIG. 14. This mandrel includes an upper cylindrical portion 211, a conical transition portion 212 and a cylindrical orientation portion 213 provided with radially protruding, axially disposed ribs 214. A cylindrical mandrel tip 215 is joined to the orienting portion 213 by a conical joining portion 216. As indicated by the directional arrow 220, the mandrel 210 is rotated by suitable means (not shown). Once again, the mandrel 210 may replace the valving element and mandrel 65 in the embodiment of FIGS. 1–4 or, alternatively, the mandrel configuration of FIGS. 13–16 may be utilized as the mandrels of FIGS. 8 and 9.

In essence, the rotatable mandrel 210 cooperates with the ribbed passage 204 to repeatedly and progressively shear plasticized material flowing through the mandrel structure. This repeated shearing again produces a tubular extrusion which is multi-axially oriented and which may be utilized for any given purpose.

I claim:

1. In an apparatus for making an oriented thermoplastic article, an accumulator for containing a body of thermoplastic material of a volume at least sufficient to form the article, means for adjusting the temperature of the body of said material while in said accumulator to a temperature conducive to orientation, means defining an orifice, said accumulator being spaced from, and communicating with, said orifice by means defining a passageway, means for advancing material under pressure from said body in said accumulator toward and through said orifice communicating with said accumulator via said passageway, means in said passageway intermediate said accumulator and said orifice for shearing said material in a non-linear shear pattern to multi-directionally orient the material prior to its issuance from said orifice, and means for chilling said multi-directionally oriented material exteriorly of said orifice to form an article in which the material is multi-directionally oriented.

* * * * *